(12) United States Patent
Berglund et al.

(10) Patent No.: US 8,842,960 B2
(45) Date of Patent: Sep. 23, 2014

(54) DUCTS TO SUPPORT A DROP ACCESS LOCATION SYSTEM FOR HORIZONTAL CABLING IN MULTI-DWELLING UNIT APPLICATIONS

(75) Inventors: Sidney J. Berglund, Round Rock, TX (US); Kurt H. Petersen, Austin, TX (US); Zachary M. Thompson, Austin, TX (US); Victor J. Borer, Austin, TX (US); Linnea M. Wilkes, Cedar Park, TX (US)

(73) Assignee: 3M Innovative Properties Company, St. Paul, MN (US)

( * ) Notice: Subject to any disclaimer, the term of this patent is extended or adjusted under 35 U.S.C. 154(b) by 346 days.

(21) Appl. No.: 12/731,744

(22) Filed: Mar. 25, 2010

(65) Prior Publication Data
US 2010/0243096 A1 Sep. 30, 2010

Related U.S. Application Data

(60) Provisional application No. 61/164,184, filed on Mar. 27, 2009.

(51) Int. Cl.
G02B 6/00 (2006.01)
F16L 3/00 (2006.01)
G02B 6/44 (2006.01)

(52) U.S. Cl.
CPC ............ *G02B 6/4459* (2013.01); *G02B 6/4466* (2013.01); *G02B 6/4495* (2013.01)
USPC ............................................ 385/136; 138/107

(58) Field of Classification Search
USPC ............................ 385/136; 138/107, 108, 115
See application file for complete search history.

(56) References Cited

U.S. PATENT DOCUMENTS

| 3,133,753 A | 5/1964 | Goodman et al. |
| 3,253,085 A * | 5/1966 | Stern ........................ 174/117 A |
| 3,491,971 A | 1/1970 | Fisher |
| 3,576,304 A | 4/1971 | Gillemot |

(Continued)

FOREIGN PATENT DOCUMENTS

| DE | 1 901 854 A1 | 8/1969 |
| DE | 44 10 558 A1 | 9/1995 |

(Continued)

OTHER PUBLICATIONS

Form PCT/ISA/210, dated Jul. 26, 2010, issued in PCT/US2009/068441.

(Continued)

*Primary Examiner* — Daniel Petkovsek
(74) *Attorney, Agent, or Firm* — Kristofor L. Storvick

(57) ABSTRACT

A duct for distributing one or more optical fiber communication lines. The duct comprises an elongated main body having a length and a conduit portion with a lengthwise bore formed therein. The conduit portion contains one or more optical fiber communications lines. The duct also includes a flange portion extending lengthwise adjacent the main body to mount the duct to a generally flat surface, wherein the duct further includes an additional fiber channel for distributing at least one additional optical fiber at least a portion of the length of the duct. The duct can also be formed as a two piece duct system. The duct can be utilized in a drop access location system for horizontal cabling in multi-dwelling unit (MDU) applications.

17 Claims, 7 Drawing Sheets

(56) References Cited

U.S. PATENT DOCUMENTS

| | | | |
|---|---|---|---|
| 3,654,379 A | 4/1972 | Rodgers | |
| 3,778,528 A | 12/1973 | Heifetz et al. | |
| 4,459,165 A | 7/1984 | Meis et al. | |
| 4,602,124 A * | 7/1986 | Santucci | 174/101 |
| 4,618,741 A | 10/1986 | Bramwell | |
| 4,804,020 A * | 2/1989 | Bartholomew | 138/111 |
| 4,911,525 A | 3/1990 | Hicks et al. | |
| 5,206,070 A | 4/1993 | Haibach | |
| 5,235,136 A * | 8/1993 | Santucci et al. | 174/68.3 |
| 5,367,122 A | 11/1994 | de Olano | |
| 5,593,756 A | 1/1997 | Miller | |
| 5,678,609 A * | 10/1997 | Washburn | 138/107 |
| 5,692,545 A * | 12/1997 | Rodrigue | 138/115 |
| 5,702,994 A | 12/1997 | Klosel | |
| 5,721,394 A | 2/1998 | Mulks | |
| 6,504,098 B2 | 1/2003 | Seamans | |
| 6,911,597 B2 | 6/2005 | Seamans et al. | |
| 7,341,403 B2 * | 3/2008 | Tsuchiya et al. | 405/183.5 |
| 7,369,738 B2 | 5/2008 | Larson et al. | |
| 7,397,993 B1 | 7/2008 | Navé et al. | |
| 7,406,241 B1 | 7/2008 | Opaluch et al. | |
| 7,668,432 B2 | 2/2010 | Mullaney | |
| 2002/0085828 A1 | 7/2002 | McGarvey | |
| 2002/0141713 A1 | 10/2002 | Okada et al. | |
| 2002/0181905 A1 | 12/2002 | Yoshida et al. | |
| 2003/0049008 A1 | 3/2003 | Zeidan | |
| 2003/0094302 A1 | 5/2003 | Magyar | |
| 2005/0213920 A1 | 9/2005 | Tanaka et al. | |
| 2008/0069513 A1 | 3/2008 | Desanti | |
| 2008/0159740 A1 | 7/2008 | Bell et al. | |
| 2008/0187276 A1 | 8/2008 | Roberts et al. | |
| 2008/0226236 A1 | 9/2008 | Pepin et al. | |
| 2009/0003782 A1 | 1/2009 | Bell et al. | |
| 2009/0060445 A1 | 3/2009 | Mullaney et al. | |
| 2009/0211171 A1 | 8/2009 | Summers | |
| 2009/0294016 A1 | 12/2009 | Sayres et al. | |
| 2009/0324188 A1 | 12/2009 | Berglund et al. | |
| 2010/0109174 A1 | 5/2010 | Abernathy et al. | |

FOREIGN PATENT DOCUMENTS

| | | |
|---|---|---|
| DE | 196 03 262 A1 | 7/1997 |
| DE | 198 43 263 A1 | 4/2000 |
| EP | 0 490 609 A | 6/1992 |
| EP | 0 992 826 A2 | 4/2000 |
| EP | 1 447 893 A1 | 8/2004 |
| FR | 1 304 739 A1 | 8/1962 |
| FR | 1304739 | 8/1962 |
| FR | 2 097 002 A1 | 3/1972 |
| FR | 2 141 599 A1 | 1/1973 |
| FR | 2 418 973 A1 | 9/1979 |
| FR | 2 568 730 A1 | 2/1986 |
| FR | 2 688 897 B1 | 9/1993 |
| FR | 2 916 284 A1 | 11/2008 |
| GB | 2 352 867 A | 2/2001 |
| GB | 2 409 587 A | 6/2005 |
| JP | 59 031902 A | 2/1984 |
| JP | 4016262 B2 | 12/2007 |
| JP | 2008-309894 A | 12/2008 |
| KR | 20-0399079 Y1 | 10/2005 |
| WO | WO 83/01868 | 5/1983 |
| WO | WO 85/04981 | 11/1985 |
| WO | WO 97/44872 | 11/1997 |
| WO | 2 377 089 A | 12/2002 |
| WO | WO 03/046622 A1 | 6/2003 |
| WO | WO 2005/096054 A1 | 10/2005 |
| WO | WO 2008/124293 | 10/2008 |
| WO | 2009/018421 | 2/2009 |
| WO | WO 2009/018421 A1 | 2/2009 |
| WO | WO 2009/158346 A2 | 12/2009 |
| WO | WO 2010/068585 A1 | 6/2010 |

OTHER PUBLICATIONS

Publication: "Flat Cable System is Introduced," 3M Megaphone Newspaper, Dec. 1962; 1 page.
Publication: "New Flat Cable is Available," 3M Megaphone Newspaper, Jun. 1964; 1 page.
Publication: "3M Cable Unsnarls Wiring Woes with the Neat System," The Tartan Magazine, 3rd Quarter 1965; 3 pages.
Form PCT/ISA/206, dated Apr. 29, 2010, issued in PCT/US2009/068441.
U.S. Appl. No. 61/164,176, filed Mar. 27, 2009, entitled "Low Profile Fiber Drop Point of Entry System and Method of Installing".
Office Action for Russian Patent Appl. No. 2011135913, mailed on May 26, 2013, 5 pp.
Notice of Allowance for Russian Patent Appl. No. 2011135913, received on Oct. 8, 2013, 5 pp.
Office Action for European Patent Appl. No. 09796545.3, mailed on Mar. 24, 2014, 3 pp.

* cited by examiner

DUCTS TO SUPPORT A DROP ACCESS LOCATION SYSTEM FOR HORIZONTAL CABLING IN MULTI-DWELLING UNIT APPLICATIONS

CROSS REFERENCE TO RELATED APPLICATION

This application claims the benefit of U.S. Provisional Patent Application No. 61/164,184, filed Mar. 27, 2009, the disclosure of which is incorporated by reference herein in its entirety.

BACKGROUND OF THE INVENTION

1. Field of the Invention

The present invention is directed to duct designs that can be used in a drop access location system for horizontal cabling.

2. Background

Several hundred million multiple dwelling units (MDUs) exist globally, which are inhabited by about one third of the world's population. Due to the large concentration of tenants in one MDU, Fiber-to-the-X ("FTTX") deployments to these structures are more cost effective to service providers than deployments to single-family homes. Connecting existing MDUs to the FTTX network can often be difficult. Challenges can include gaining building access, limited distribution space in riser closets, and space for cable routing and management. Specifically, FTTX deployments within existing structures make it difficult to route cables within the walls or floors, or above the ceiling from a central closet or stairwell, to each living unit.

Conventionally, a service provider installs an enclosure (also known as a fiber distribution terminal (FDT)) on each floor, or every few floors, of an MDU. The FDT connects the building riser cable to the horizontal drop cables which run to each living unit on a floor. Drop cables are spliced or otherwise connected to the riser cable in the FDT only as service is requested from a tenant in a living unit. These service installations require multiple reentries to the enclosure, putting at risk the security and disruption of service to other tenants on the floor. This process also increases the service provider's capital and operating costs, as this type of connection requires the use of an expensive fusion splice machine and highly skilled labor. Routing and splicing individual drop cables can take an excessive amount of time, delaying the number of subscribers a technician can activate in one day, reducing revenues for the service provider. Alternatively, service providers install home run cabling the full extended length from each living unit in an MDU directly to a fiber distribution hub (FDH) in the building vault, therefore encompassing both the horizontal and riser with a single extended drop cable. This approach creates several challenges, including the necessity of first installing a pathway to manage, protect and hide each of the multiple drop cables. This pathway often includes very large (e.g., 2 inch to 4 inch to 6 inch) pre-fabricated crown molding made of wood, composite, or plastic. Many of these pathways, over time, become congested and disorganized, increasing the risk of service disruption due to fiber bends and excessive re-entry.

SUMMARY

According to an exemplary aspect of the present invention, a duct for distributing one or more optical fiber communication lines comprises an elongated main body having a length and a conduit portion with a lengthwise bore formed therein. The conduit portion contains one or more optical fiber communications lines. The duct also includes a flange portion extending lengthwise adjacent the main body to mount the duct to a generally flat surface, wherein the duct further includes an additional fiber channel for distributing at least one additional optical fiber at least a portion of the length of the duct.

In one aspect, the at least one additional channel comprises a first external fiber channel extending along the length of the main body external to the conduit portion and configured to releasably grip the at least one additional optical fiber. In another aspect, the at least one additional channel further comprises a second external fiber channel separate from the first external channel extending along the length of the main body external to the conduit portion and configured to releasably grip a second additional optical fiber.

In another aspect, the at least one additional channel comprises a first auxiliary internal fiber channel formed within the main body and extending along the length of the main body separate from the conduit portion and configured to contain at least one additional optical fiber. In another aspect, the at least one additional channel further comprises a second auxiliary internal fiber channel formed within the main body and extending along the length of the main body separate from the conduit portion and the first auxiliary channel and configured to contain at least one additional optical fiber.

In another aspect, the duct further includes a strength member channel disposed lengthwise within the main body and separate from the conduit portion.

In another aspect, the conduit portion comprises a first conduit having a first lengthwise bore formed in the main body and the additional fiber channel comprises a second conduit having a second lengthwise bore formed in the main body separate from the first conduit. The first conduit is configured to contain a first set of one or more optical fiber communication lines and the second conduit is configured to contain a second set of one or more optical fiber communication lines.

In another aspect of the invention, a duct for distributing one or more optical fiber communication lines comprises an elongated main body having a length and a conduit portion with a lengthwise bore formed therein. The conduit portion contains one or more optical fiber communications lines. The duct also includes an elongated mounting track configured to receive the elongated main body, the mounting track including one or more retention structures to releasably receive the main body, the mounting track including a mounting surface to mount the mounting track to a generally flat surface.

The above summary of the present invention is not intended to describe each illustrated embodiment or every implementation of the present invention. The figures and the detailed description that follows more particularly exemplify these embodiments.

BRIEF DESCRIPTION OF THE DRAWINGS

The present invention will be further described with reference to the accompanying drawings, wherein.

Figure 1:
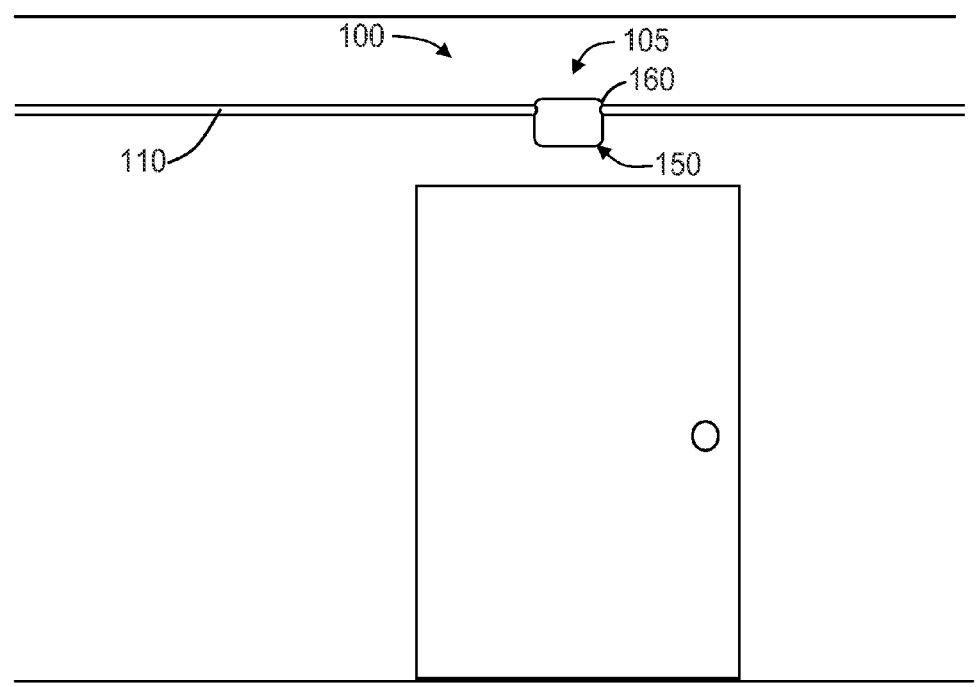
FIG. 1 is a schematic view of a drop access location system according to a first aspect of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the invention as defined by the appended claims.

DETAILED DESCRIPTION OF THE EMBODIMENTS

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "forward," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

The present invention is directed to flexible duct designs that support a drop access point or location installation system for use in horizontal cabling applications at an MDU (which for purposes of this application can include a typical MDU, multiple tenant unit (MTU), school, hotel, hospital or other location). The various ducts described herein provide telecommunications lines that are used to connect with drop lines from individual living units, such as residences, classrooms, or offices, within the MDU. The duct designs help provide a low impact system profile for better aesthetics. The ducts can be installed on the walls of a corridor or hallway in an existing building to provide new communications wiring to individual residences and offices, where the wiring can include optical fiber, electrical wiring, or a combination thereof. As such, new or improved service can be provided to individual living units, which can be accommodated by quickly connecting short runs of cabling in the living unit to the new communications wiring pre-positioned outside the living unit when the additional communications line is installed.

FIG. 1 shows a schematic view of a drop access location system 100. In this example, system 100 is installed in a hallway of an exemplary MDU. System 100 can be utilized in other indoor and outdoor applications, and in commercial or residential buildings, such as in office buildings, professional suites, and apartment buildings. The fiber drop access point system 100 comprises a conduit or duct 110 which contains one or more communications lines (such as horizontal cables or lines, not shown in FIG. 1) from a telecommunications closet (or other distribution location) to one or more living units. The communications lines can comprise optical fibers, electrical wires, coaxial/micro-coaxial cable, or a combination of these, for data, video, and/or telephone signal transmission. In one aspect, the communications lines can comprise discrete (loose) or ribbonized fiber, such as 900 µm buffered fiber(s) or other standard size communications fiber. In addition, although the exemplary aspects described herein are often specific to accessing optical fiber lines, it would be understood by one of ordinary skill in the art given the present description that the system can be configured to accommodate electrical wire drops and hybrid combination drops as well.

System 100 can comprise one or more access boxes 150 that are located at one or more access points 105, such as at or near the entryway of a living unit. As is described in U.S. Patent Publication No. 2009/0324188, incorporated by reference herein in its entirety, an exemplary drop access box 150 can include a base portion and a cover, where the access box (cover and base) can have a low profile and/or decorative outer design. Alternatively, the drop access box can be designed as a low profile base unit for a drop fiber point of entry system, such as is described in the pending U.S. Patent Application No. 61/164,176, incorporated by reference herein in its entirety. In addition, the system 100 can be installed in the hallway or passageway of an MDU as is described in U.S. Patent Publication No. 2009/0324188, incorporated by reference above.

In addition, the exemplary drop access box can include a mounting section that provides for straightforward mounting of the box 150 onto the duct 110. Mounting section 160 is configured to fit onto and over duct 110. In this manner, box 150 can be mounted to duct 110 after the duct (and the communication lines therein) are already installed. In addition, the configuration of mounting section allows for box 150 to be mounted onto duct 110 at nearly any location along the duct path. This configuration allows a through hole to be drilled into the living unit at a later time. In addition, this system configuration allows for multiple possible access box locations, including above door locations or at lower height locations in the hallway of the MDU.

Figure 2:
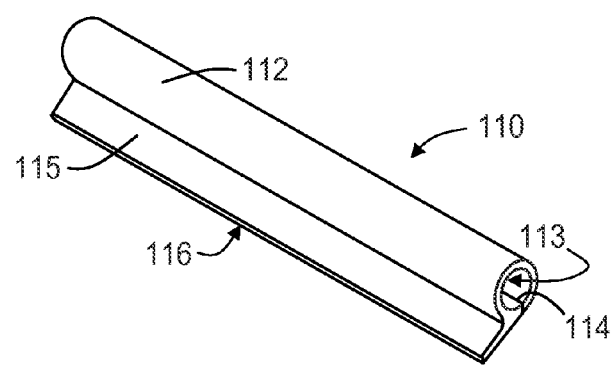
FIG. 2 is an isometric view of an exemplary flexible duct.

In more detail, a close-up isometric view of an exemplary duct 110 is shown in FIG. 2. While system 100 is described herein as being implemented with a duct 110, it is noted that other types of duct designs, especially ducts 410, 510, 610, 710, 810, and 910 as described in more detail below, can be utilized in system 100.

In the example of FIG. 2, duct 110 includes a conduit portion 112 having a bore 113 provided therethrough. The bore is sized to accommodate one or more communications lines disposed therein. In a preferred aspect, in use, the duct 110 comprises a plurality of communications lines, such as buffer coated optical fibers. In use, the duct 110 can be prepopulated with one or more communications lines. In addition, duct 110 may also be populated with at least one electrical power line.

While conduit portion 112 can have a generally circular cross-section, in alternative embodiments it may have another shape, such as a rectangle, square, triangle, oval, or other polygonal shaped cross-section.

In one aspect, duct 110 is a structure formed from a polymeric material such as polyvinyl chloride (PVC), making it flexible, flame retardant and robust. As such, duct 110 can be guided and bent around corners and other structures without cracking or splitting. Duct 110 can be continuously formed using a conventional extrusion process.

In addition, duct 110 can further include a slit 114 that runs the longitudinal length of the duct. Slit 114 can provide access for inserting or removing the fiber. In the embodiment of FIG. 2, slit 114 is positioned at the base of the generally circular conduit portion 112. However, in alternative embodiments the slit may be positioned at a different position (e.g., top or middle) on the conduit portion 112. In an alternative aspect, the slit can be within overlapping wall surfaces of the conduit to ensure the communications lines are properly restrained within the conduit portion. This structure can further promote a more aesthetically pleasing duct. This alternative slit can be opened by the installer to access the communications lines within the conduit portion. In a further alternative, duct 110 can include multiple longitudinal slits for access or separation of services (e.g., for use with a divided conduit). In a further alternative, the slit can be sealed (using a conventional heat or laser welding technique) during the manufacturing process after population of the conduit portion with communications lines. Accordingly, the duct 110 can be provided to the installer without a slit. In a further alternative aspect, the conduit portion 112 can be directly extruded over the communications line(s) in an over jacket extrusion process.

Duct 110 also includes a flange 115 or similar flattened portion to provide support for the duct 110 as it is installed on or fastened to a wall or other generally flat surface, such as a wall, floor, ceiling, or molding. The flange extends along the longitudinal axis of the duct as shown in FIG. 2. While the exemplary duct includes a single flange 115 positioned (in use) below the conduit portion, in alternative aspects, the flange can be centrally located adjacent the conduit portion. In a further alternative, duct 110 can include a second flange portion for added surface area support. Moreover, the flange 115 can be formed as a sawtooth shape (not shown) to permit in-plane bends along walls or other flat surfaces. In alternative applications, a portion of the flange can be removed for in-plane and out-of-plane bending.

In a preferred aspect, the flange 115 includes a rear surface 116 that has a generally flat surface shape. This flat surface provides a suitable surface area for adhering the duct 110 to a mounting surface, a wall or other surface (e.g., a dry wall, concrete, or other conventional building material) using an adhesive, such as an epoxy, transfer adhesive or double-sided tape. In one alternative aspect, flange surface 116 comprises an adhesive-lined surface with a removable liner. In use, the liner can be removed and the surface 116 can be applied to a mounting surface. In alternative aspects, other mechanical fastening techniques (e.g., nails, staples, mounting brackets, etc.) can be utilized. Also, as the exemplary duct 110 is flexible, it can be adhered to modestly curved surfaces as well.

One or more communications lines disposed within duct 110 can be accessed and connected to one or more drop wires or drop fibers of a particular living unit. In this particular exemplary aspect, a first fiber from duct 110 can be coupled to drop fiber cable from a particular living unit. In another aspect, more than one fiber from the duct can be accessed at a particular drop or point of entry location. The communication fiber(s) can be accessed either through a separate window cut made to the conduit portion of the duct or through the slit 114 already formed in duct 110, depending on the particular configuration of the duct.

In one aspect, the communications fiber comprises a tight bend radius, 900 μm buffered optical fiber. Such an optical fiber cable is commercially available as BendBright XS™ Single Mode Optical Fiber, from Draka Communications. Also in this aspect, an exemplary drop cable comprises a 2.9 mm jacketed drop cable commercially available as ez Patch cabling and ez Drop cabling from Draka Communications. A coupling or adapter can be used in the access box 150 to connect the telecommunications line to the drop fiber cable. In an exemplary aspect, the telecommunications fiber is field terminated with an optical fiber connector, such as described in U.S. Pat. No. 7,369,738. Other optical fiber connectors, such as SC-APC, SC-UPC, LC, or MTP/MPO, can be utilized.

The drop cable from the individual living unit can be a conventional fiber cable such as a 2.9 mm jacketed fiber cable (e.g., an ez Drop Cable, available from Draka Communications) or blown fiber cabling (containing multiple discrete buffered fibers). The drop cable can be run in either direction (i.e., to or from the access box 150), and can (or not) be pre-connectorized at one or two ends (e.g., a pre-connectorized pigtail of 2.9 mm jacket cable). The drop fiber cable can be terminated on the other end at an optical network terminal (ONT), such as a single family unit optical network terminal (SFU ONT) or wall box (e.g., a 7342 Indoor Optical Terminal, available from Alcatel-Lucent), such as ONT 205 shown in FIG. 3.

Figure 3:
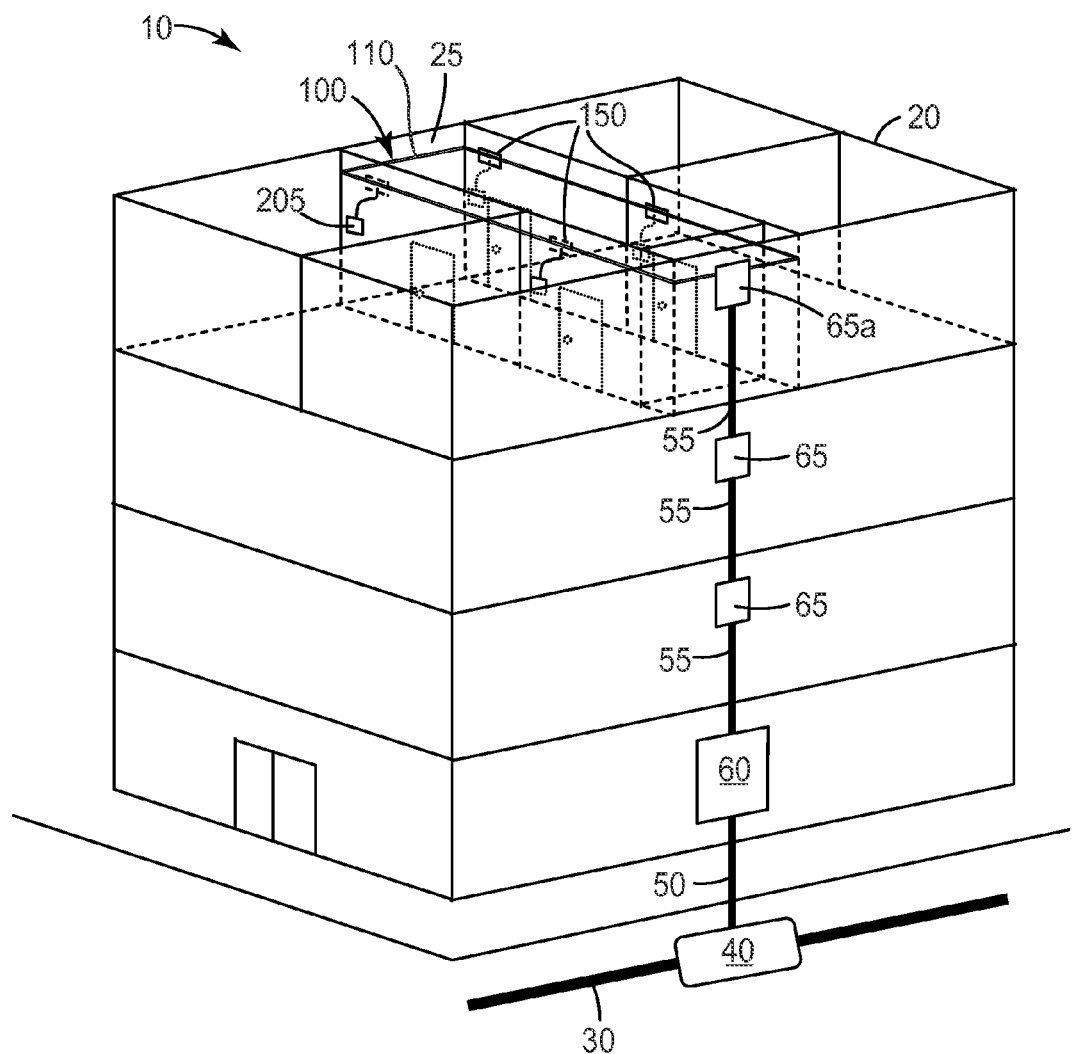
FIG. 3 is a schematic view of an exemplary MDU having a drop access location system according to an aspect of the present invention installed therein.

FIG. 3 shows an example MDU 10 that can accommodate the exemplary drop access system described herein. MDU 10 is a multi-floor structure having a plurality of living units located therein. One example floor 20 has four living units having a common hallway 25. Feeder cable 30 brings communications lines to and from building 10. These feeder lines are spliced to the MDU's cabling at a splice closure 40. The building feeder lines 50 are distributed to the building from a fiber distribution hub (FDH) 60. Each floor includes a fiber distribution terminal (FDT) 65 that receives communications lines via riser cable 55. In the present example, a drop access system 100 coupling the communications lines from FDT 65a can be installed on hallway 25 such as is described above, where drop access boxes 150 can be disposed at each living unit and can receive one or more fiber optic communication lines from duct 110.

As is also mentioned above, the drop access location system can be configured to accommodate electrical wire drops and hybrid combination drops as well. In alternative aspects, the drop access location system can be configured to supply at least one of uninterrupted DC power and AC power to an optical network terminal located in an individual living unit at the drop location.

Figure 4:
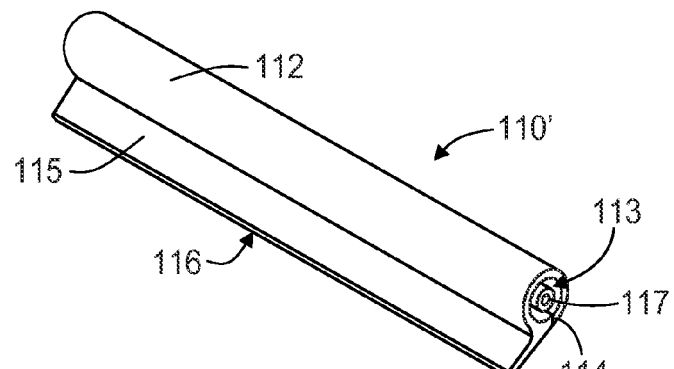
FIG. 4 is an isometric view of an alternative flexible duct according to another aspect of the invention.

In another aspect, an alternative duct 110' is shown in FIG. 4. Duct 110' can include an inner tube 117 positioned within the bore 113 of the conduit portion 112 of the duct that can provide an additional conduit to feed or blow at least one additional fiber within the tube. The flange 115, slit 114, and surface 116 can be formed in the same manner as described above. As such, the inner tube can provide service to at least one additional living unit or to replace a damaged fiber. For example, the inner tube 117 can allow a technician to insert or fish an additional communication line to a living unit without having to re-install the duct. Furthermore, the fiber installed in the inner tube 117 may be spliced or connected to one of a spare, currently unused fiber going forward from a fiber that was dropped to provide service to a prior living unit, to provide service to additional forward living units, or to recover a damaged fiber. The tube 117 may be formed separately or as part of the duct 110'.

Figure 5A:
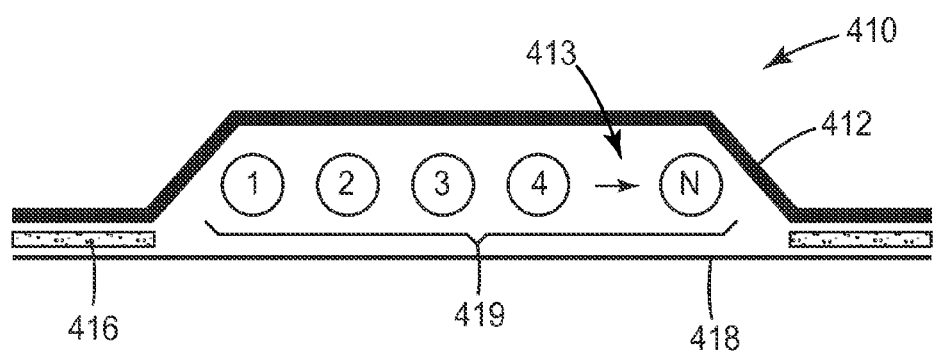
FIGS. 5A and 5B are cross section views of alternative ducts according to other aspects of the invention.
Figure 5B:
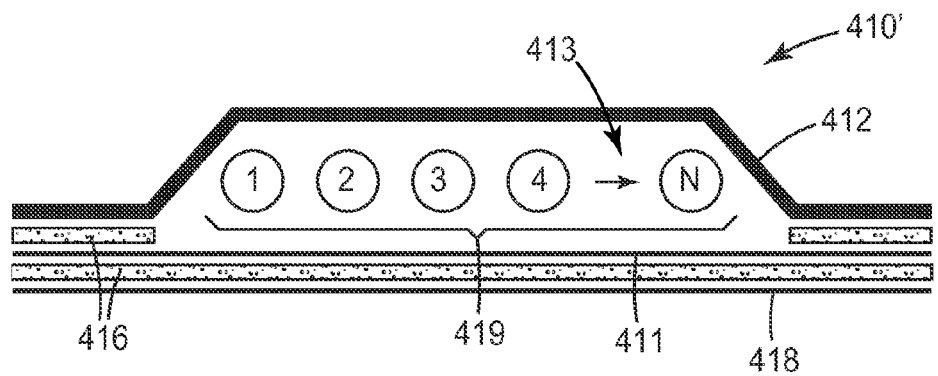

FIGS. 5A and 5B show cross-section views of alternative ducts 410 and 410'. In the alternative aspect shown in FIG. 5A, the duct 410 comprises a low-profile, adhesive-backed ribbon fiber tape. The duct 410 includes a cover material 412 that may be formed from a label stock material. Alternatively, cover material 412 can be formed from an extrusion, such as a PVC material. In a preferred aspect, the cover material 412 can be selected to provide flame resistance, such as V0 flame resistance for agency listing. The cover material 412 can be a paintable material, or, in a further alternative, cover material 412 may be covered with a decorative molding or wall paper. The cover material 412 may be a co-extruded material with a foamed inner material (nearest the optical fibers 419) and a more rigid outer material to provide physical protection to the optical fibers 419. The foamed inner material can provide a cushion or damper in the event of an impact to the duct and the outer material can provide a surface that can withstand tensile loads that may be experienced during installation and can protect against unintended accidental impacts. The outer material can also provide for flame resistance and can be easily cleaned.

Optical fibers 419 (shown as fibers 1–N) are disposed in a cavity portion formed between cover material 412 and the wall or surface of installation. An adhesive 416, such as a factory applied 3M VHB 4941F adhesive tape, is disposed on a mounting side of the main body outside the cavity region 413. The adhesive backing may include a releasable liner 418.

In the further alternative aspect shown in FIG. 5B, the duct 410' comprises a low-profile, adhesive-backed ribbon fiber tape. In this aspect, a base sheet 411 is provided between the cover material 412 and the wall or surface of installation. An additional adhesive bonds the base sheet 411 to the wall-side of the cover material 412.

In yet another alternative aspect, the cover material 412, adhesive 416, and base sheet 411 can be formed from transparent materials, thereby providing a duct that is nearly unnoticeable for an aesthetically pleasing appearance.

The optical fibers 419 can be disposed within cavity 413 as free floating for straightforward extraction via a window cut or a slit over the preferred fiber. In this configuration, excess fiber can be freely pulled from within the cavity 413 for storage and termination within the access box 150, thus available for service delivery to a living unit. The liner 418 is removed at the time of application of the duct to the wall or surface of installation.

Figure 6A:
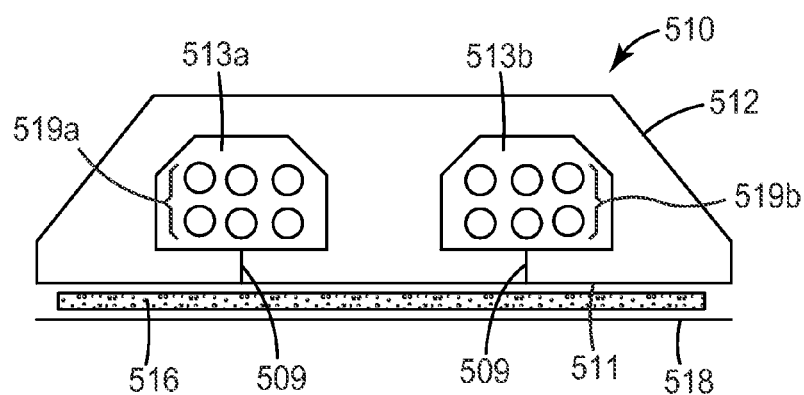
FIGS. 6A and 6B are cross section end views of alternative ducts having multiple fiber compartments according to other aspects of the invention.

As mentioned above, the duct can include a divided conduit. In another aspect of the invention, an alternative duct 510 and an alternative duct 510' are shown in end view in FIGS. 6A and 6B, respectively, with each alternative duct having multiple fiber conduits. In FIG. 6A, the duct 510 includes an elongated main body 512. In one aspect, duct 510 is a structure formed from a polymeric material such as polyvinyl chloride (PVC), making it flexible, flame retardant and robust, such that it can be formed from an extrusion. In a preferred aspect, the duct material can be selected to provide flame resistance, such as V0 flame resistance for agency listing. The main body 512 can be a paintable material, or, in a further alternative, main body 512 may be covered with a decorative molding or wall paper. Duct 510 includes multiple conduits extending lengthwise with the main body, in this example a first conduit 513a and a second conduit 513b, formed in the main body 512. One or more optical fibers 519a are disposed in the first conduit 513a and one or more optical fibers 519b are disposed in the second conduit 513b. The number and type of fibers can follow a fiber count and color code that meets country specific standards. These fibers may be inserted during an over jacket extrusion process into the conduit regions or via slits 509 shortly following the extrusion process. Thereafter, an adhesive 516, such as a 3M VHB 4941F adhesive, can be disposed on a mounting side 511 of the main body outside the conduit region 513a-513b. The adhesive backing may include a releasable liner 518.

Figure 6B:
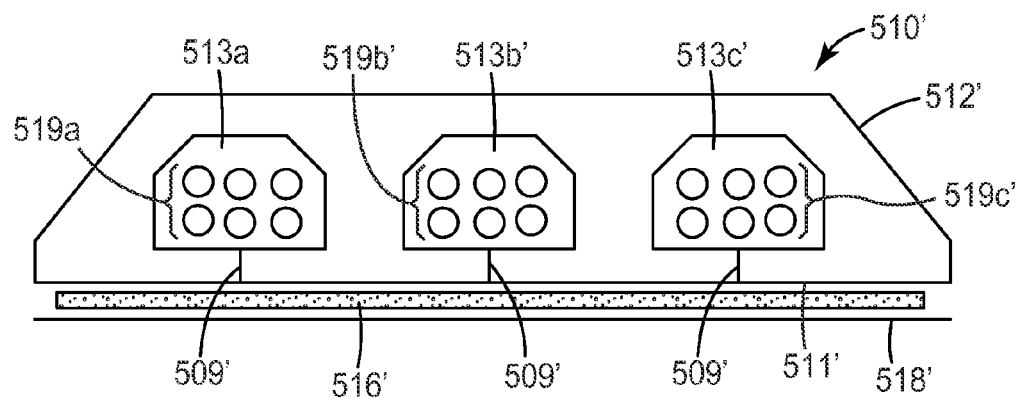

Alternatively, in FIG. 6B, the duct 510' includes multiple conduits, in this example a first conduit 513a'; a second conduit 513b'; and a third conduit 513c' that extend lengthwise with the main body 512'. One or more optical fibers 519a' are disposed in the first conduit 513a', one or more optical fibers 519b' are disposed in the second conduit 513b', and one or more optical fibers 519c' are disposed in the third conduit 513c'. These fibers may be inserted during an over jacket extrusion process into the conduit regions or via slits 509' shortly following the extrusion process. Thereafter, an adhesive 516' can be disposed on a mounting side 511' of the main body outside the conduit region 513a'-513c'. The adhesive backing may include a releasable liner 518'. As would be apparent to one of ordinary skill in the art given the present description, the main body of these compartmentalized ducts can be modified to include a greater number of fiber conduits, as is appropriate for a given application.

These alternative duct profiles show compartmentalized designs with multiple partitioned conduits or chambers that provide separation for multiple service providers or separation of fiber count for easy selection of the dedicated service fiber. For example, in the aspect shown in FIG. 6A, a first set of fibers from a first service provider can be disposed in conduit 513a and a second set of fibers from a second (and different) service provider can be disposed on conduit 513b. This configuration can allow for maintenance and repair by one service provider without disturbing the fiber communications lines of the other service provider servicing customers in that hallway and/or MDU.

Furthermore, in an alternative aspect, one or more of the conduits may be a spare empty conduit that allows for at least one fiber to be blown through the conduit to provide service to an additional customer(s) or even make a repair to re-establish service should the other fibers be damaged during construction or otherwise. Alternatively the spare conduit(s) may be outfitted with a pull string to pull the at least one fiber through the conduit.

Figure 7:
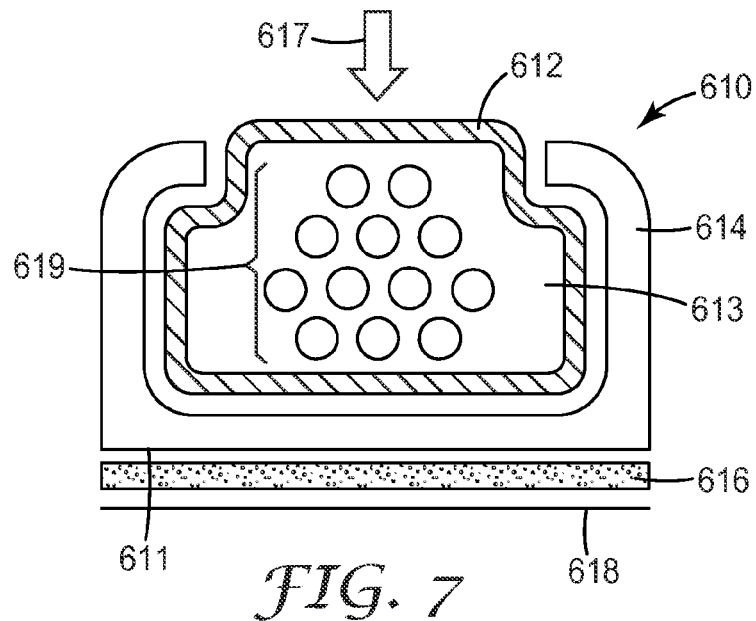
FIG. 7 is a cross section end view of a two piece duct according to another aspect of the invention.

In another aspect of the invention, an alternative duct 610 is shown in end view in FIG. 7, with duct 610 having a two piece design. In FIG. 7, a main body 612 includes a conduit portion 613 that can be pre-populated with one or more optical fibers 619 (e.g., six, eight, or twelve optical fibers). The main body 612 can be formed from a material such as those described above, e.g., a polymeric material such as polyvinyl chloride (PVC). The main body 612 can be inserted (by pressing downward in the direction of arrow 617) into a base or mounting track 614, which is configured to snugly receive the main body 612. An adhesive 616 can be disposed on a mounting side 611 of the mounting track. The adhesive backing may include a releasable liner 618. Alternative, the mounting track 614 can be mechanically fastened to the hallway wall or mounting surface. In operation, the main body 612 can later be removed from the mounting track 614 intact, and the mounting track 614 can remain or it can be removed during hallway redecoration or repairs, such as re-wallpapering or refinishing, while the fiber filled main body 612 is undisturbed, thereby maintaining customer service.

Figure 8:
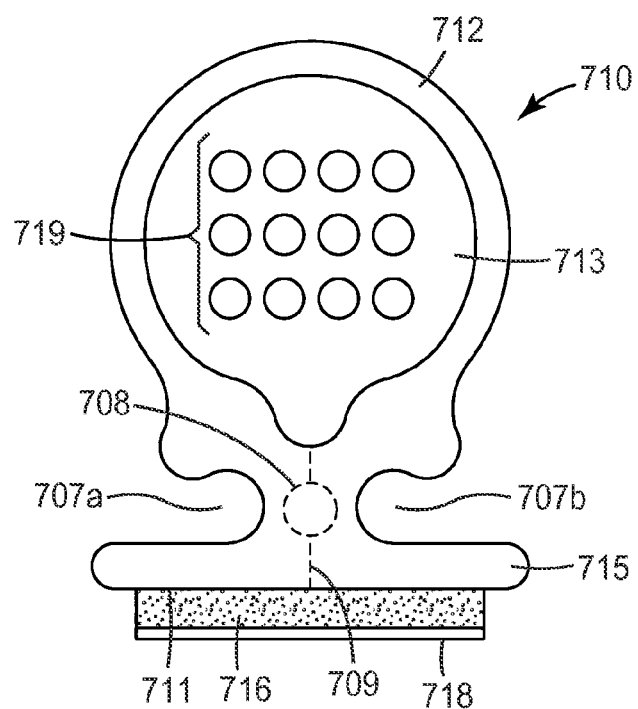
FIG. 8 is a cross section end view of a duct having an external fiber channel according to another aspect of the invention.

In another aspect of the invention, an alternative duct 710 is shown in end view in FIG. 8, with duct 710 having an omega-shaped cross section and one or more external fiber channels 707a and 707b. In FIG. 8, a main body 712 includes a conduit portion 713 extending lengthwise therethrough that can be pre-populated with one or more optical fibers 719. The main body 712 can be formed from a material such as those described above, e.g., a polymeric material such as polyvinyl chloride (PVC). In addition, the main body 712 can also (optionally) include a separate strength member channel 708 disposed centrally between the flange portion 715 and the conduit portion 713 and also extending lengthwise therethrough. The strength member channel 708 can include a strength member, such as an aramid yarn, metallic wire, fiberglass member, or Kevlar material that enables the duct 710 to be deployed in riser applications that provides service to several floors from a single collector location. Alternatively, channel 708 can be utilized to carry an electrical wire therein. Access to the channel 708 (and conduit portion 713) can be provided through (optional) slit 709.

Further, duct 710 can include one or more external fiber channels 707a and 707b extending along the length of the main body. These external channels are configured to grip an optical fiber external to the conduit portion 713 for a variety of applications. For example, the external fiber channel(s) can provide a structure for adding additional optical fiber for repair or recovery of a damaged fiber, adding an additional fiber to provide service to an additional subscriber without the need to deploy another fiber-filled duct, or providing the ability to reposition the location of a terminated fiber for disposition into the living unit. The external fiber channels 707a and 707b are preferably disposed on the outside of the main body 712, between the conduit portion 713 and the flange 715. An adhesive 716 can be disposed on a mounting side 711 of the flange 715. The adhesive backing may include a releasable liner 718.

Figure 9A:
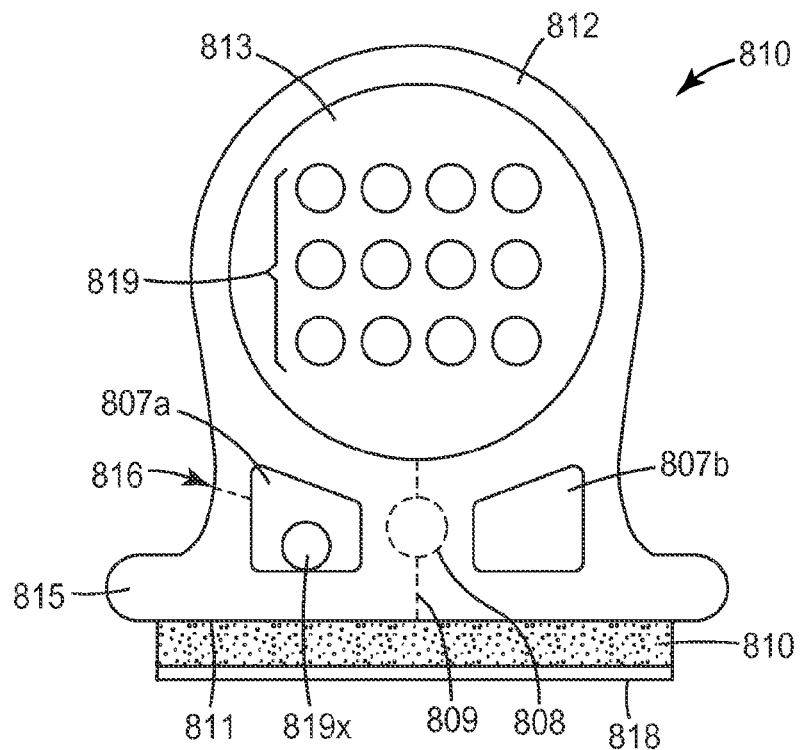
FIG. 9A is a cross section end view of a duct having multiple internal fiber channels in one piece form and FIG. 9B is an isometric end view of a duct having multiple internal fiber channels in two piece form according to other aspects of the invention.

In yet another aspect of the invention, an alternative duct 810 is shown in end view in FIG. 9A, with duct 810 having a generally omega-shaped cross section and one or more additional or auxiliary fiber channels 807a and 807b extending lengthwise with the main body 812. In FIG. 9A, main body 812 includes a conduit portion 813 that can be pre-populated with one or more optical fibers 819. While conduit portion 813 can have a generally circular bore formed throughout, in alternative embodiments it may have another shape, such as a rectangle, square, triangle, oval, or other polygonal shaped cross-section. The main body 812 can be formed from a material such as those described above. In addition, the main body 812 can also (optionally) include a strength member channel 808 disposed centrally between the flange portion 815 and the conduit portion 813. The strength member channel 808 can include a strength member, such as an aramid yarn, metallic wire, fiberglass member or Kevlar material, that extends with the main body and provides structural support throughout. Alternatively, channel 808 can be utilized to carry an electrical wire therein. Access to the channel 808 (and conduit portion 813) can be provided through (optional) slit 809. An adhesive 816 can be disposed on a mounting side 811 of the flange 815. The adhesive backing may include a releasable liner 818.

Figure 9B:
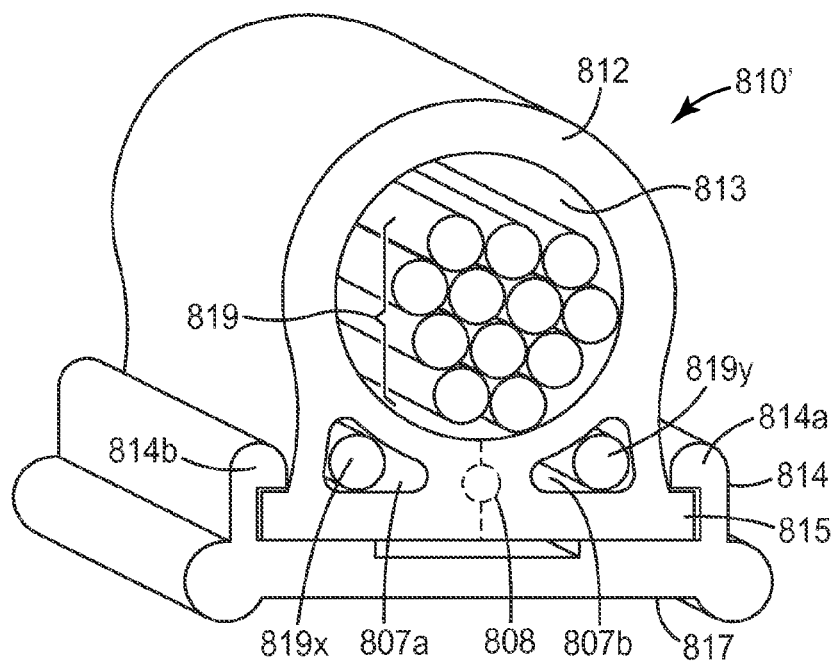

Further, duct 810 can include one or more additional or auxiliary internal fiber channels 807a and 807b. In this example, auxiliary channel 807a includes an additional optical fiber 819x disposed therein (FIG. 9B shows a second additional optical fiber 819y disposed in auxiliary channel 807b). This additional fiber(s) can be utilized for providing service to an additional customer, for repair, or for repositioning as discussed above. The wall of the duct can be factory slit during extrusion at the position marked 806. This additional slit can allow field access to the auxiliary internal fiber channel 807a by the field craftsman to insert a new fiber or reposition a fiber within channel 807a. This slit positioning can also provide for the duct 810 to be more easily positioned around corners. The duct 810 can also be formed around a template to maintain proper bend radius of the fiber for good transmission without the requirement to use planar corner accessories.

In a further alternative, as is shown in FIG. 9B, a duct 810' can be formed as a two-piece duct, where the main body 812 can be snuggly mounted to a clip or mounting track 814, from which it is also removable therefrom. In this configuration, mounting track 814 is configured to receive flange portion 815. In this alternative aspect, flange 815 can be retained in mounting track 814 via snap fit with retention structures 814a, 814b. In this particular aspect, main body 812 can be removed from mounting track 814 by a pressing force that pushes the retention structures away from each other. The mounting track 814 includes a mounting surface 817 that can be adhesively mounted or mechanically fastened to a wall or other mounting structure, in a manner similar to that described above.

Figure 10:
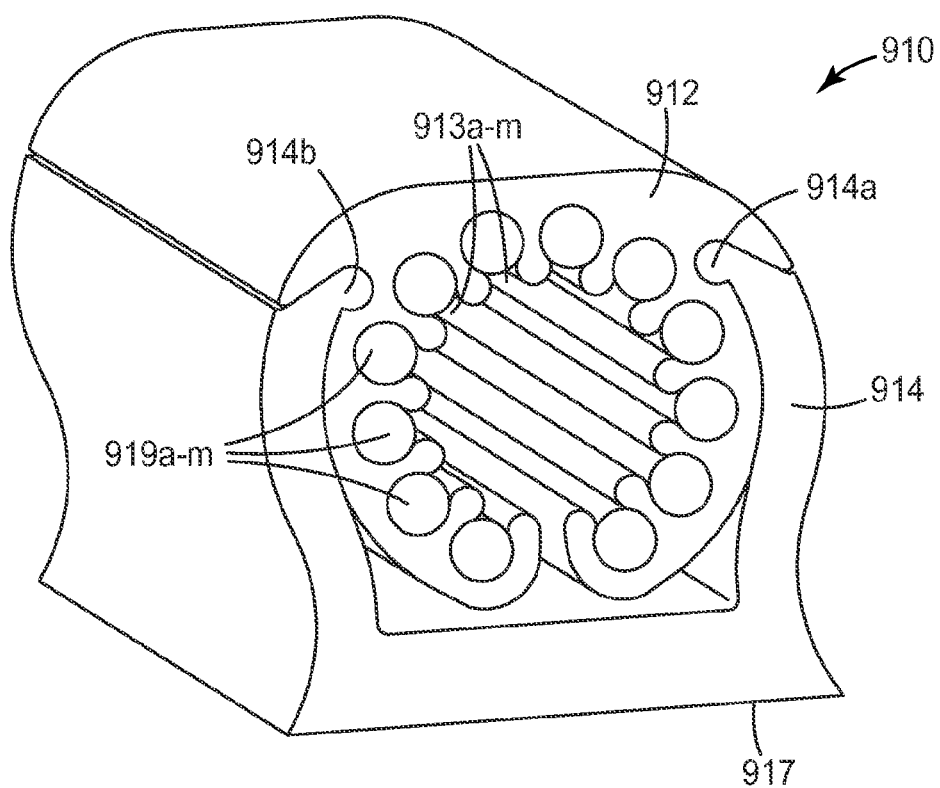
FIG. 10 is an isometric end view of another two piece duct according to another aspect of the invention.

In yet a further alternative aspect, FIG. 10 shows a duct 910 having an elongated main body portion 912 mounted to a clip or mounting track 914 via retention structures 914a and 914b. In this alternative aspect, main body 912 is formed as an open structure having a plurality of fiber receiving channels 913a-913n, each configured to receive and retain an individual optical fiber 919a-919n. The mounting track 914 includes a mounting surface 917 that can be adhesively mounted or mechanically fastened to a wall or other mounting structure, in a manner similar to that described above.

While many of the ducts described herein are shown having a symmetrical shape, the duct designs can be modified to have an asymmetric shape (such as a flange wider on one side than the other), as would be apparent to one of skill in the art given the present description.

Moreover, the ducts described herein may be coextruded with at least two materials. A first material can exhibit properties that afford protection of the optical fibers within the conduit portion of each duct such as against accidental damage due to impact, compression, or even provide some protection against intentional misuse such as stapling. A second material can provide functional flexibility for cornering within a plane or mechanically snapping into a clip or mounting track, thus allowing for maintaining service when the duct is removed from its clip or mounting track on the wall (as described above for repair or redecorating a wall). The flange portion of the duct may be extruded of a lower durometer material that allows it to be easily formed around a corner while maintaining a planar surface for secure bonding and wetting of the adhesive to the wall. The material forming the external wall near the conduits can provide a way for straightforward access such as making a window cut for accessing the fibers.

In some aspects, the ducts are typically extruded with a V0 flame resistant material, and can be of a material that is paintable, or in a further alternative, covered with another decorative material. In some applications, the ducts can often be filled with 900 µm buffer coated bend insensitive fibers that comply with ITU 652-D, ITU 657-A and ITU 657-B standards, though other fibers may be used such as 250 µm coated fibers, ribbon fibers of 2-fiber, 4-fiber or more, or even jacket fibers or bundled fibers.

Moreover, the ducts described herein may further include RFID (or other remote-accessible) tagging that provides desired information to the craftsman such as service provider, fiber assignment, and type of service.

The duct designs described herein can be utilized in drop access location systems to lower the installation cost of a critical segment of the FTTX network by offering increased speed and ease of deployment. This duct system can be utilized in MDUs (such as typical MTUs, schools, hotels, hospitals, office buildings, and other locations). The ducts can also be utilized to improve building hallway aesthetics important to owners and tenants. Moreover, the duct designs described herein can be configured to accommodate hybrid drops for providing communications and power service to an individual customer.

The present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the present specification. The claims are intended to cover such modifications and devices.

What is claimed is:

1. A duct for distributing one or more optical fiber communication lines, comprising:
   a one-piece elongated main body having a conduit portion with a lengthwise bore formed therein forming a first chamber, the conduit portion containing one or more optical fiber communications lines disposed in the first chamber, and a flange portion extending lengthwise adjacent and along the main body, the flange portion being mountable to a surface, wherein the flange portion is located below the conduit portion, wherein the flange portion further includes an adhesive backing disposed on a mounting surface thereof, and wherein the duct further includes at least one additional fiber channel formed separate from the first chamber for distributing at least one additional optical fiber at least a portion of the length of the duct, wherein the at least one additional fiber channel comprises a first external fiber channel extending along the length of the main body external to the conduit portion and configured to releasably grip the at least one additional optical fiber.

2. The duct of claim 1, wherein the at least one additional fiber channel further comprises a second external fiber channel separate from the first external channel extending along the length of the main body external to the conduit portion and configured to releasably grip a second additional optical fiber.

3. The duct of claim 1, further comprising an auxiliary internal fiber channel formed within the main body and extending along the length of the main body separate from the conduit portion and configured to contain at least one additional optical fiber.

4. The duct of claim 3, further comprising a second auxiliary internal fiber channel formed within the main body and extending along the length of the main body separate from the conduit portion and the first auxiliary channel and configured to contain at least one additional optical fiber.

5. The duct of claim 1, further comprising a strength member channel disposed lengthwise within the main body and separate from the conduit portion.

6. The duct of claim 5, wherein the strength member channel is disposed between the flange portion and the conduit portion.

7. The duct of claim 5 wherein the strength member channel includes a strength member formed from at least one of an aramid yarn, metallic wire, fiberglass member and a Kevlar material.

8. The duct of claim 5, wherein the strength member channel includes an electrical wire.

9. The duct of claim 1, wherein the conduit portion comprises a first conduit having a first lengthwise bore formed in the main body and wherein the additional fiber channel comprises a second conduit having a second lengthwise bore formed in the main body separate from the first conduit, wherein the first conduit is configured to contain a first set of one or more optical fiber communication lines and the second conduit is configured to contain a second set of one or more optical fiber communication lines.

10. The duct of claim 9, further comprising a third conduit having a third lengthwise bore formed in the main body separate from the first and second conduits.

11. The duct of claim 9, wherein the first set of one or more optical fiber communication lines provide services from a first service provider and the second set of one or more optical fiber communication lines provide services from a second service provider.

12. The duct of claim 1, wherein the duct is formed from a flexible material.

13. The duct of claim 1, wherein the one or more communications lines comprise one of a plurality of loose optical fibers and a fiber ribbon cable.

14. The duct of claim 1, wherein the duct is formed from a co-extrusion of at least two different materials.

15. The duct of claim 1, wherein the duct comprises a slit formed in the main body to permit access to one or more of the communications lines disposed therein.

16. A duct for distributing one or more optical fiber communication lines, comprising:
   a one-piece elongated main body having a conduit portion with a lengthwise bore formed therein forming a first chamber, the conduit portion containing one or more optical fiber communications lines disposed in the first chamber, and a flange portion extending lengthwise adjacent and along the main body, the flange portion being mountable to a surface, wherein the flange portion is centrally located adjacent the conduit portion, wherein the flange portion further includes an adhesive backing disposed on a mounting surface thereof, and wherein the duct further includes an additional fiber channel formed separate from the first chamber for distributing at least one additional optical fiber at least a portion of the length of the duct, wherein the at least one additional channel comprises a first external fiber channel extending along the length of the main body external to the conduit portion and configured to releasably grip the at least one additional optical fiber.

17. The duct of claim 16, wherein the at least one additional channel further comprises a second external fiber channel separate from the first external channel extending along the length of the main body external to the conduit portion and configured to releasably grip a second additional optical fiber.

* * * * *